United States Patent
Konda et al.

(10) Patent No.: US 11,245,685 B2
(45) Date of Patent: Feb. 8, 2022

(54) METHODS AND APPARATUS TO VERIFY ENCRYPTED HANDSHAKES

(71) Applicant: McAfee, LLC, Santa Clara, CA (US)

(72) Inventors: Tirumaleswar Reddy Konda, Bangalore (IN); Harsha R. Joshi, Bangalore (IN); Shashank Jain, Bengaluru (IN); Himanshu Srivastava, Bangalore (IN); Srikanth Nalluri, Bangalore (IN); Naveen Kandadi, Bengaluru (IN)

(73) Assignee: MCAFEE, LLC, San Jose, CA (US)

( * ) Notice: Subject to any disclaimer, the term of this patent is extended or adjusted under 35 U.S.C. 154(b) by 305 days.

(21) Appl. No.: 16/296,199

(22) Filed: Mar. 7, 2019

(65) Prior Publication Data
US 2020/0236104 A1 Jul. 23, 2020

(30) Foreign Application Priority Data
Jan. 23, 2019 (IN) .............................. 201941002776

(51) Int. Cl.
*H04L 29/06* (2006.01)
*H04L 9/08* (2006.01)

(52) U.S. Cl.
CPC .......... *H04L 63/0823* (2013.01); *H04L 9/088* (2013.01); *H04L 63/12* (2013.01); *H04L 63/166* (2013.01)

(58) Field of Classification Search
None
See application file for complete search history.

(56) References Cited

U.S. PATENT DOCUMENTS

| 9,106,661 B1* | 8/2015 | Stamos ............... G06Q 30/0283 |
| 9,923,923 B1* | 3/2018 | Sharifi Mehr ............ H04L 9/14 |
| 2004/0098588 A1 | 5/2004 | Ohba et al. |
| 2008/0046717 A1 | 2/2008 | Kanekar et al. |
| 2008/0126794 A1* | 5/2008 | Wang .................. H04L 63/0823 713/151 |

(Continued)

FOREIGN PATENT DOCUMENTS

KR 20160005113 1/2016

OTHER PUBLICATIONS

Fischlin et al., "Replay Attacks on Zero Round-Trip Time: The Case of the TLS 1.3 Handshake Candidates," [https://eprint.iacr.org/2017/082.pdf], 2nd IEEE European Symposium on Security and Privacy (S&P 2017), Feb. 2, 2017, pp. 60-75, retrieved on May 10, 2019, 50 pages.

(Continued)

*Primary Examiner* — Benjamin E Lanier
(74) *Attorney, Agent, or Firm* — Hanley, Flight & Zimmerman, LLC (57) ABSTRACT

Methods, apparatus, systems and articles of manufacture are disclosed to verify encrypted handshakes. An example apparatus includes a message copier to clone a client introductory message, the client introductory message is included in a first handshake for network communication between a client and a server, a connection establisher to initiate a second handshake between the apparatus and the server based on the cloned client introductory message, and a decrypter to, in response to the second handshake, decrypt a certificate sent by the server.

17 Claims, 6 Drawing Sheets

(56) References Cited

U.S. PATENT DOCUMENTS

| | | | |
|---|---|---|---|
| 2010/0199099 A1* | 8/2010 | Wu | H04L 9/3263 713/182 |
| 2010/0299525 A1 | 11/2010 | Shah et al. | |
| 2011/0154026 A1* | 6/2011 | Edstrom | H04L 63/0823 713/158 |
| 2016/0080328 A1 | 3/2016 | Bollay et al. | |
| 2019/0058714 A1* | 2/2019 | Joshi | H04L 9/3268 |
| 2019/0074982 A1* | 3/2019 | Hughes | H04L 9/0863 |
| 2019/0173863 A1* | 6/2019 | Chen | H04L 63/0442 |

OTHER PUBLICATIONS

Breedijk, "TLS Renegotiation Attack. More Bad News for SSL," [https://stories.schubergphilis.com/tls-renegotiation-attack-more-bad-new], Nov. 8, 2009, retrieved on Nov. 11, 2018, 4 pages.

Anderson et al., "Deciphering Malware's Use of TLS (without Decryption)," [https://arxiv.org/pdf/1607.01639], arXiv:1607.01639v1, Jul. 6, 2016, 15 pages.

Mozilla Security Blog, "Distrust of Symantec TLS Certificates," [https://blog.mozilla.org/security/2018/03/12/distrust-symantec-tls-certificates/], Mar. 12, 2018, Accessed via [https://web.archive.org/web/20180313053149/https://blog.mozilla.org/security/2018/03/12/distrust-symantec-tls-certificates/] on Aug. 23, 2019, 3 pages.

Speccy, "Fast, lightweight, advanced system information tool for your PC," [https://www.ccleaner.com/speccy], 5 pages. Jan. 25, 2018, Accessed via [https://web.archive.org/web/20180125015519/https://www.ccleaner.com/speccy] on Aug. 23, 2019, 6 pages.

Brandom, "Hackers emptied Ethereum wallets by breaking the basic infrastructure of the internet," [https://www.theverge.com/2018/4/24/17275982/myetherwallet-hack-bgp-dns-hijacking-stolen-ethereum], Apr. 24, 2018, 3 pages.

Sheffer et al., "Recommendations for Secure Use of Transport Layer Security (TLS) and Datagram Transport Layer Security (DTLS)," [https://tools.ietf.org/html/rfc7525], Internet Engineering Task Force, May 2015, 27 pages.

Rescorla, "The Transport Layer Security (TLS) Protocol Version 1.3," [https://tools.ietf.org/html/rfc8446], Internet Engineering Task Force, Aug. 2018, 160 pages.

Leyden, "Samsung smart fridge leaves Gmail logins open to attack," [https://www.theregister.co.uk/2015/08/24/smart_fridge_security_fubar/], Aug. 24, 2015, 6 pages.

Brumaghin et al., "CCleanup: A Vast Number of Machines at Risk," [https://blog.talosintelligence.com/2017/09/avast-distributes-malware.html], Sep. 18, 2017, 23 pages.

O'Neill, "Trustico revokes 23,000 SSL certificated due to compromise," [https://www.cyberscoop.com/trustico-digicert-ssl-certificates-revoked/], Feb. 28, 2018, 6 pages.

International Searching Authority, "Written Opinion," issued in connection with International Patent Application No. PCT/US2019/068837, dated Apr. 29, 2020, 5 pages.

International Searching Authority, "Search Report," issued in connection with International Patent Application No. PCT/US2019/068837, dated Apr. 29, 2020, 4 pages.

* cited by examiner

METHODS AND APPARATUS TO VERIFY ENCRYPTED HANDSHAKES

FIELD OF THE DISCLOSURE

This disclosure relates generally to handshake verification, and, more particularly, to methods and apparatus to verify encrypted handshakes.

BACKGROUND

In some environments, communications sent between a client device (e.g., a personal computer, a smart fridge, a cellular phone) and a server are monitored by a traffic manipulator (e.g., a middlebox) for verification of the trustworthiness of the entities involved in the communications. In such environments, the traffic manipulator acts as an observer (e.g., a sniffer) of the communications between the client device and the server to obtain a server certificate (e.g., a transport layer security (TLS) 1.1 certificate, a TLS 1.2 certificate, a secure sockets layer (SSL) certificate), verify the certificate (e.g., determine whether the certificate is valid or not), and respond appropriately upon the validity determination (e.g., block communications if the certificate is invalid).

BRIEF DESCRIPTION OF THE DRAWINGS

The figures are not to scale. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A client device (e.g., a cellular phone, a gaming console, a smart refrigerator, or any suitable communication capable device) communicates with a remote server to obtain relevant data for operation and/or transmit collected data to the remote server. For example, if a person using a cellular phone would like to access an internet webpage, such user would utilize the cellular phone to coordinate with a remote server to gain secure access to the webpage. Typically, during such communication session, a handshake is initiated by the client device (e.g., a cellular phone, a gaming console, a smart refrigerator, or any suitable communication capable device) with the remote server. The handshake is initiated by the client device using a client device introductory message (e.g., a ClientHello message) which may include relevant security protocol information, destination information, client device information, etc. Once the server receives the client device introductory message (e.g., the ClientHello message), the server responds with a respective server introductory message (e.g., a ServerHello message). The transmission and reception of both the client introductory message (e.g., the ClientHello message) and the server introductory message (e.g., the ServerHello message) between the client device and the server as well as the exchange of connection and/or protocol information to facilitate establishment of a connection is hereinafter referred to as a handshake. In examples disclosed herein, the handshake is not limited to including the introductory messages (e.g., the ClientHello message) and the server introductory message (e.g., the ServerHello message) and, in fact, may be any suitable process of negotiation between two devices (e.g., the client and the server) in which the negotiation establishes connection protocols, mechanisms for secure handshake, mechanisms for secure handshakes, etc.

The introductory messages (e.g., the ClientHello message and/or the ServerHello message) are sent using specified mechanisms for secure handshake. Mechanisms for secure handshakes include Transport Layer Security (TLS) version 1.1, TLS 1.2, TLS 1.3, or Secure Sockets Layer (SSL). In TLS 1.1 and TLS 1.2, introductory messages (e.g., the ClientHello message and/or the ServerHello message) are available for inspection, sniffing, and/or observing by a traffic manipulator (e.g., a router). When a client device initiates a handshake (e.g., sends a client introductory message), such client device specifies the mechanism for secure handshake to be used. In TLS 1.1 and 1.2, the traffic manipulator (e.g., the router) can observe the transfer of introductory messages between the client device and the server to verify that the server is providing valid information. During such a transfer, a security certificate is typically sent by the server to prove the identity of the server (or another device or entity). For example, in TLS 1.1 and TLS 1.2, a traffic manipulator (e.g., a router) can inspect the server certificate sent by the server in the server introductory message. The security certificate may be validated with the traffic manipulator in communication with a remote validation server or any other suitable validation method.

The TLS 1.3 mechanism for secure handshake and some other mechanisms for secure handshakes, on the other hand, include extensions that encrypt the server introductory message (e.g., Encrypted Extensions). As such, traffic manipulators (e.g., routers or gateways) using deep packet inspection (DPI) are unable to decrypt and/or decipher security certificates sent by the server in the server introductory message. Prior approaches to verify the encrypted security certificate and/or various information in the encrypted server introductory message include utilizing the traffic manipulator as a full proxy. If TLS 1.3 or other like mechanisms for secure handshakes are being used, a full proxy is capable of observing the encrypted messages sent after the client introductory message (e.g., the server introductory message with the security certificate). The use of a full proxy involves downloading and/or installing a certificate (e.g., a root certificate controlled by the traffic manipulator) on client devices. In an enterprise system, the download and/or installation of the certificate (e.g., the root certificate) on client devices and/or available endpoints is feasible as it typically includes increased processing power and is trusted for certificate installation on client devices and/or available endpoints.

In a consumer home networks and systems, the installation of the certificate (e.g., the root certificate) on client devices (e.g., the Internet of Things (IoT) devices in a home) is less plausible than in an enterprise system. Typically, in consumer home networks and systems, installation of the certificate (e.g., the root certificate) on varying client devices is logistically complicated. For example, the client devices may be produced by varying manufactures and installation of a certificate (e.g., the root certificate) on client devices may be unavailable (e.g., access may be unavailable). Additionally, installing the certificate (e.g., the root certificate) on client devices in a consumer home network may be construed as a privacy invasion because the traffic manipulator has access to all encrypted messages between the client and the server.

Additionally, in consumer home networks and systems, traffic manipulators (e.g., a router) do not typically have the computing or processing power to act as a full proxy. Acting as a full proxy involves decrypting and encrypting all traffic flows, an act which a typical consumer router does not have the processing power to accomplish.

Examples disclosed herein utilize the traffic manipulator (e.g., a router) in a network (e.g., a home consumer network and/or system) as a partial proxy. In such examples, the traffic manipulator observes the initial client introductory message (e.g., the ClientHello message). In examples disclosed herein, the observation of the initial client introductory message from a device communicatively coupled with the traffic manipulator (e.g., a device attempting to establish a connection with a web server) is initiated in parallel with the handshake between a client device and the server. For example, if the mechanism for secure handshake TLS 1.3 is being utilized, the client device may transmit an initial introductory message (e.g., the ClientHello message) to a server which can be observed by the traffic manipulator (e.g., the router).

Examples disclosed herein include cloning (e.g., copying, duplicating, replicating) the client introductory message. In such examples, relevant parameters to be included in a conditional handshake with the server are to be copied from the original client introductory message. In some examples disclosed herein, some parameters of the client introductory message are not cloned (e.g., the Diffie-Hellman (DHE) or the Ephemeral Elliptic Curve Diffie-Hellman (ECDHE) parameters may not be cloned.)

Examples disclosed herein include initiating a conditional handshake with the desired server by transmitting the cloned client introductory message (e.g., a cloned ClientHello message modified so that the response is accessible by the traffic manipulator). Furthermore, examples disclosed herein include utilizing the traffic manipulator (e.g., the router) to obtain the respective server introductory message in response to the transmitted cloned client introductory message. Examples disclosed herein include deriving a respective secret key in the traffic manipulator in response to obtaining the server introductory message.

In examples disclosed herein, the traffic manipulator acts as a partial proxy. In such manner, the traffic manipulator can verify the validity of communications from a server, while using the mechanism for secure handshake TLS 1.3, and without installing a certificate (e.g., a root certificate) on client devices. Examples disclosed herein include verifying security information sent using the mechanism for secure handshake TLS 1.3 without having to exercise the amount of computational and processing power as exercised in a full proxy. Additionally, examples disclosed herein may include verifying security information sent using the Datagram Transport Layer Security (DTLS) 1.3, or any other suitable mechanism for secure handshake.

Figure 1:
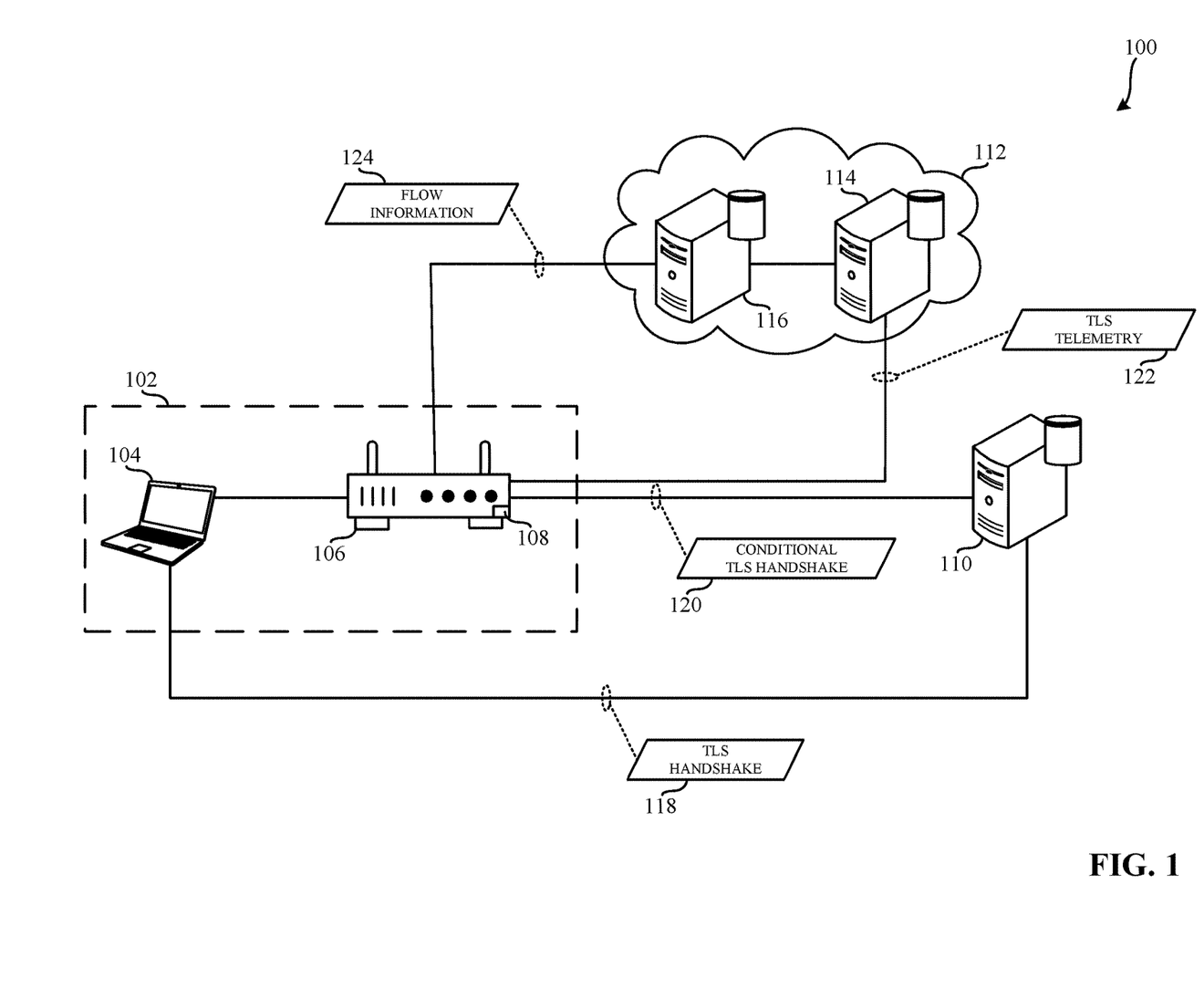
FIG. 1 is a block diagram illustrating an example environment in which a network of communications between devices and a server are monitored and verified.

FIG. 1 is a block diagram illustrating an example environment 100 in which a network of communications between devices and a server 110 are monitored and verified. The environment 100 further includes a communications link to an example Device Telemetry Server 112. In examples disclosed herein, the home network 102 includes an example client device 104 and an example traffic manipulator 106.

The example client device 104 communicates with the server 110 utilizing the TLS 1.3 mechanism for secure handshake. The example client device 104 is shown as a personal computer; however, the methods and apparatus disclosed herein may be utilized with any communication capable device such as a smart refrigerator, a smart thermostat, a cellular phone, a portable electronic device, a smart phone, a laptop, a server, and/or any other suitable device. The client device 104 communicates with the server 110 via wireless communications protocol (e.g., Wi-Fi, ZigBee, Bluetooth, etc.). In other examples disclosed herein, the client device 104 may communicate with the server 110 via wired communications or any other suitable method of communication.

The example traffic manipulator 106 is a computing device which may facilitate and/or observe communications between the client device 104 and the server 110. The example traffic manipulator 106 in the home network 102 serves as an intermediate node between the client device 104 and the server 110. In the illustrated example, the traffic manipulator 106 transforms, inspects, filters, and/or otherwise manipulates communication traffic between the client device 104 and the server 110. In examples disclosed herein, the traffic manipulator 106 may be a wireless router, a firewall, an intrusion detection system, a network address translator, a load balancer, a general computing device, a virtual machine implemented on a computing device, a software implemented manipulator and/or data monitor, or any suitable device. In the illustrated example, the traffic manipulator 106 includes an example validator 108.

The example validator 108 verifies the security certificate (e.g., an SSL certificate) exchanged during handshakes including the example client device 104. For example, the validator 108 may analyze a certificate for wireless internet protocol (e.g., Hyper Text Transfer Protocol Secure, Constrained Application Protocol (CoAP)) flows. In the illustrated example, the validator 108 interacts with the server 110 (e.g., by cloning communications and transforming the source of communications sent by the client device 104 or otherwise simulating communications from the client device 104) during handshakes between the client device 104 and the server 110. For example, the client device 104 may initiate a handshake with the server 110 to gain access to a website hosted by the server 110. In such an example, if the client device 104 is configured to utilize TLS 1.3 protocol, the messages and/or data sent by the server in response to the handshake request will be encrypted. Furthermore, in such an example, the validator 108 utilizes the initial handshake request (e.g., a ClientHello message, an introduction message, etc.) sent by the client device 104 to facilitate a second handshake with the server to obtain a respective server introductory message (e.g., to act as a partial proxy) for verification.

The example server 110 is a computing device, including a processor, that manages, organizes, facilitates, and/or distributes resources for a service and/or centralized resource. The example server 110 includes domain specific information for use by the client device 104. The server 110 may be a Domain Name Server (DNS), a TLS security-based server, or any other suitable server. In such an example, the server 110 communicates with the client device 104 via the traffic manipulator 106. In other examples disclosed herein, the server 110 may communicate with the Device Telemetry Server 112, or any other suitable client device in the home network 102.

The example Device Telemetry Server 112 includes an example Device Telemetry Manager 114 and an example security management server 116. In examples disclosed herein, the Device Telemetry Server 112 communicates with the traffic manipulator 106 to obtain an indication of certificate validity sent by the server 110.

In the example illustrated in FIG. 1, the Device Telemetry Manager 114 is a computing device, including a processor, that manages, organizes, facilitates, and/or distributes resources for a service and/or centralized resource. The example Device Telemetry Manager 114 illustrated in FIG. 1 obtains the TLS Telemetry 122 from the example traffic manipulator 106. In the illustrated example of FIG. 1, the Device Telemetry Manager 114 is illustrated as a server with a repository to store the TLS Telemetry 122. In other examples disclosed herein, the Device Telemetry Manager 114 may be implemented as the device Telemetry Server 112. For example, the device Telemetry server 112 may perform the actions of the Device Telemetry Manager 114. In other examples disclosed herein, the Device Telemetry Manager 114 may be implemented as a plurality of servers, a network of device (e.g., a cloud), etc.

In the example illustrated in FIG. 1, the security management server 116 is a computing device, including a processor, that manages, organizes, facilitates, and/or distributes resources for a service and/or centralized resource. The example security management server 116 communicates with the Device Telemetry Manager 114 to obtain the TLS telemetry 122. In examples disclosed herein, the security management server 116 transmits example flow information 124 to the traffic manipulator 106. The security management server 116 processes the TLS telemetry 122 to determine whether the TLS handshake 118 is a valid handshake. The security management server 116 indicates to the traffic manipulator 106 if the TLS handshake 118 is valid based on prior TLS telemetry 122. For example, if the security management server 116 has previously encounted the TLS telemetry 122 (e.g., the client device 104 initiated a similar TLS handshake 118 in addition), then the security management server 116 indicates via the flow information 124 to the traffic manipulator 106 of the verified additional TLS handshake. In such examples, use of processing power and processing resources by the traffic manipulator is reduced due having access to previous security information. In other examples disclosed herein, the security management server may be implemented as a plurality of servers, a network of device (e.g., a cloud), etc.

An example TLS handshake 118 is a handshake request initiated by the client device 104. The TLS handshake 118 includes a series of messages and/or information utilized to negotiate communication protocols between the client device 104 and the server 110. In the illustrated example, the TLS handshake 118 is sent using the TLS 1.3 protocol. In other examples disclosed herein, the TLS handshake 118 may be sent using the TLS 1.1 protocol, TLS 1.2 protocol, or any other suitable handshake protocol. In the illustrated example of FIG. 1, the TLS handshake 118 is illustrated as using the TLS 1.3 protocol. In other examples, the TLS handshake 118 may be any other suitable handshake (e.g., any handshake using a suitable protocol). The TLS handshake 118 includes an introductory message (e.g., a ClientHello message) and messages carrying varying parameters such as the Ephemeral Diffie-Hellman (DHE) and/or the Ephemeral Elliptic Curve Diffie-Hellman (ECDHE). In response to the introductory message sent from the client device 104, the server 110 sends a responsive introductory message (e.g., a ServerHello message) to the client device 104. When the client device 104 initiates the TLS handshake 118 using the TLS 1.3 protocol and in some other communication protocols, all communications after the server introductory message are encrypted.

An example conditional handshake 120 is a handshake request initiated by the example traffic manipulator 106. The conditional handshake 120 includes data extracted from the TLS handshake 118. The extracted data includes relevant parameters of the introductory message issued by the client device 104 (e.g., the ClientHello message). In examples disclosed herein, the conditional handshake 120 does not include various key agreement protocols (e.g., the Ephemeral Diffie-Hellman (DHE) or the Ephemeral Elliptic Curve Diffie-Hellman (ECHDE) parameters) conveyed by the client device 104. In the illustrated example of FIG. 1, the conditional TLS handshake 120 is illustrated as using the TLS 1.3 protocol. In other examples, the conditional TLS handshake 120 may be any other suitable handshake (e.g., any handshake using a suitable protocol. In examples disclosed herein, the example conditional handshake 120 is sent by the client device 104 in response to detecting an introductory message initiated by the client device 104 (e.g., the TLS handshake 118, a ClientHello message). Additionally, in response to the introductory message sent from the traffic manipulator 106, the server 110 sends a responsive introductory message to the traffic manipulator 106 (e.g., a ServerHello message). In examples disclosed herein, An example TLS telemetry 122 includes data sent by the traffic manipulator 106 to the example Device Telemetry Server 112. In examples disclosed herein, the TLS telemetry 122 contains machine learning (ML) classification information obtained from the conditional TLS handshake 120. The TLS telemetry 122 may be automatically, semi automatically, periodically, and/or aperiodically, sent to the Device Telemetry Server 112. In other examples disclosed herein, the TLS telemetry 122 may be sent to various other devices such as the client device 104, the server 110, or any suitable device in communication with the traffic manipulator 106.

Example flow information 124 includes classification information (e.g., TLS version protocols supported, certificate validity, handshake success result) to be shared with the example traffic manipulator 106. In other examples, the home network 102 includes multiple traffic manipulators in communication and, therefore, the flow information 124 may be distributed to each respective traffic manipulator or, to a single traffic manipulator for distribution in the home network 102. In the example illustrated in FIG. 1, the flow information 124 may include relevant classification information for the domain accessed by the client device 104, along with a domain classification feed from the security management server 116. In such examples, the flow information 124 is sent when the traffic manipulator 106 observers the client device 104 initiates the TLS handshake 118 (e.g., sends a Domain Name Server (DNS) query) to the server 110.

Figure 2:
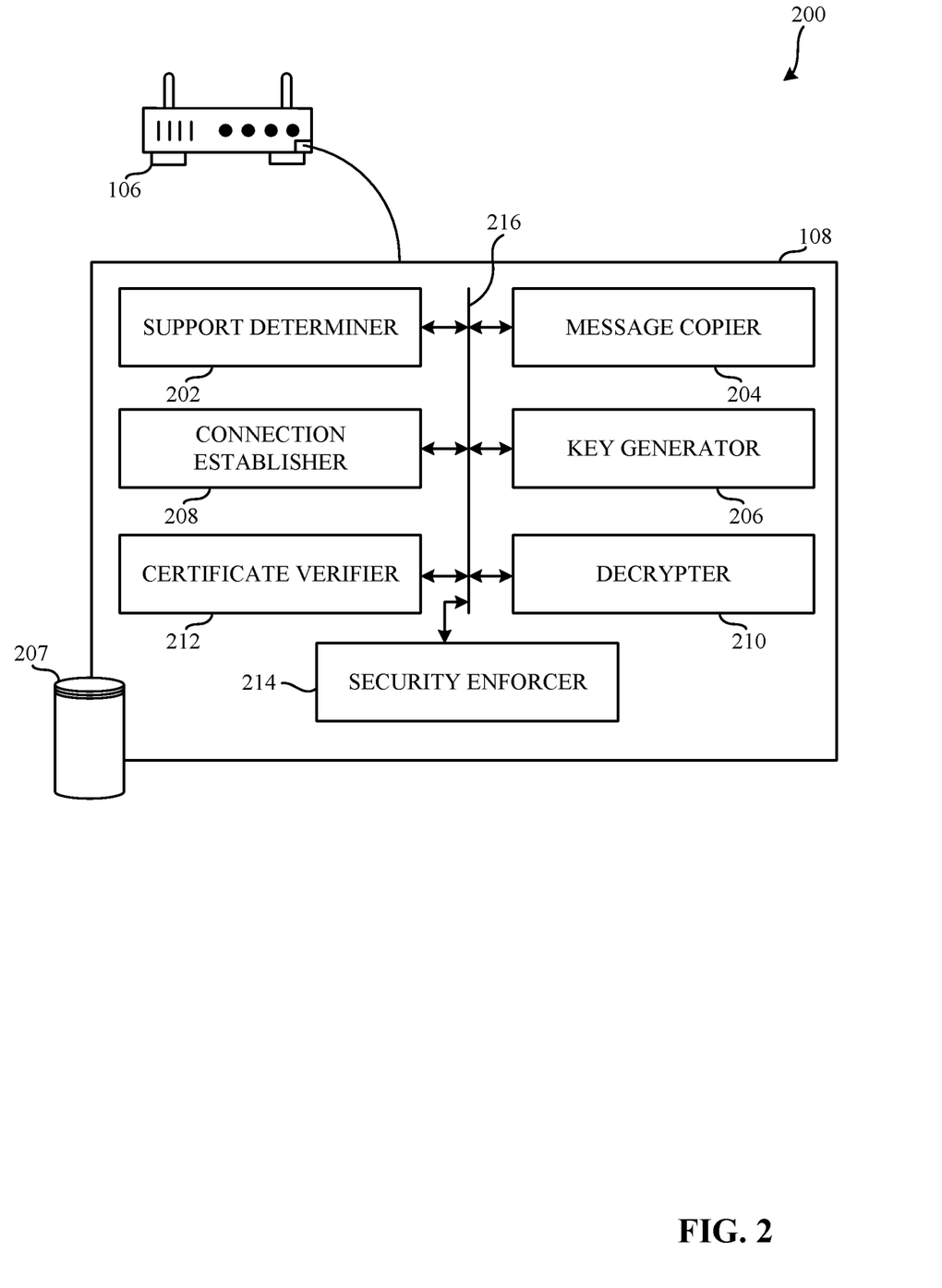
FIG. 2 is a block diagram of an example implementation of the validator of FIG.

FIG. 2 is a block diagram 200 of an example implementation of the validator 108 of FIG. 1. The example validator 108 includes an example support determiner 202, an example message copier 204, an example key generator 206, an example connection establisher 208, an example decrypter 210, an example certificate verifier 212, and an example security enforcer 214. The example support determiner 202, the example message copier 204, the example key generator 206, the example connection establisher 208, the example decrypter 210, the example certificate verifier 212, and/or the example security enforcer 214 communicate via an example communication bus 216.

The example support determiner 202 determines if the client device 104 is utilizing a supported mechanism for secure handshake (e.g., TLS 1.3). In examples disclosed herein, the support determiner 202 inspects the client device 104 handshake (e.g., the TLS handshake 118) to determine the mechanism for secure handshake. If the support determiner 202 determines that the client device 104 handshake is abiding by a supported mechanism for secure handshake (e.g., the validator 108 can obtain information from), then the support determiner 202 communicates with the message copier 204 to identify the supported mechanism for secure handshake. In examples disclosed herein, the supported mechanism for secure handshake is TLS 1.3. Alternatively, in other examples, the supported mechanism for secure handshake may be any suitable mechanism for secure handshake in which the validator 108 may identify (e.g., TLS 1.1, TLS 1.2, etc.).

The example message copier 204 observes a handshake initiated by the client device 104 (e.g., the TLS handshake 118) to determine the initial client introductory message (e.g., a ClientHello message). In examples disclosed herein, the message copier 204 clones (e.g., copies, replicates, and/or duplicates) the client introductory message (e.g., the ClientHello message). The message copier 204 communicates the cloned (e.g., copied, replicated, and/or duplicated) client introductory message (e.g., the ClientHello message) to the example key generator 206.

The example key generator 206 generates a private key after obtaining the cloned (e.g., copied, replicated, and/or duplicated) introductory message of the client device 104 from the message copier 204. In examples disclosed herein, the generated private key is initiated using respective traffic manipulator parameters such as respective DHE and/or ECDHE parameters based on the DHE and/or ECDHE groups selected by the client device 104. In some examples disclosed herein, the key generator 206 stores the respective private key in the example local memory 207. Alternatively, in other examples, the key generator 206 may store the private key in a remote location (e.g., cloud, offsite server center, etc.).

The example local memory 207 is a computing device that stores information, data, and/or messages. In some examples, the local memory 207 is implemented by hardware components. The example local memory 207 is internal to the validator 108; however, in some examples, the local memory 207 is external or located in a remote location with respect to the validator 108. The example local memory 207 is utilized by the key generator 206 to store the generated private key. In other examples disclosed herein, the local memory 207 is used by the validator 108 to store various messages and/or parameters.

The example connection establisher 208 initiates a connection (e.g., the Conditional TLS handshake 120 of FIG. 1) with the server 110 of FIG. 1 using the introductory message cloned from the client device 104. In examples disclosed herein, the connection establisher 208 initiates a separate connection with the server 110 in parallel with the client device 104. For example, for a period of time (e.g., a few seconds, a few minutes, etc.), the server 110 communicates with the client device 104 and the traffic manipulator 106 simultaneously. In such an example, the server 110 communicates equivalent server certificates (e.g., server certificates included in a ServerHello message) to both the client device 104 and the traffic manipulator 106. In examples disclosed herein, the connection establisher 208 waits for the server introductory message after initiating the connection (e.g., the Conditional TLS handshake 120) with the server 110.

The example decrypter 210 communicates with the example connection establisher 208 to derive a respective secret key. The decrypter 210 parses the server introductory message to obtain the server key (e.g., the public key). Furthermore, the decrypter 210 derives the respective secret key as a function of the server key (e.g., the public key) and the respective private key generated by the key generator 206. In some examples disclosed herein, the decrypter 210 stores the respective secret key in local memory 207. Alternatively, in other examples, the decrypter 210 stores the secret key in a remote location (e.g., wireless cloud, offsite server center, etc.). The decrypter 210 utilizes the derived secret key to decrypter communications sent by the server 110.

The example certificate verifier 212 is in communication with the example decrypter 210 to obtain decrypted information (e.g., metadata, security certificates, etc.). In examples disclosed herein, the certificate verifier 212 verifies the validity of the security certificate sent by the server 110. The certificate verifier 212 may be in communication with a remote certificate verification server to determine whether the security certificate sent by the server 110 is valid. In alternative examples, the certificate verifier 212 communicates with the example Device Telemetry Server 112 of FIG. 1 to determine if the security certificate sent by the server 110 is valid. In such examples, the Device Telemetry Server 112 contains information pertaining to previous communications between the client device 104 and the server 110 and, thus, inherently trusts such communication. Furthermore, in such example, the traffic manipulator 106 communicates with the Device Telemetry Server 112 to verify the security certificate sent by the server 110 while using much less processing power (e.g., no longer having to communicate with a remote certificate verification server).

The example security enforcer 214 communicates with the example certificate verifier 212 to determine whether the security certificate sent by the server 110 is valid. If the security enforcer 214 obtains indication that the security certificate sent by the server 110 is valid, then the security enforcer 214 closes communication between the traffic manipulator 106 and the server 110. Alternatively, the security enforcer 214 may block the connection between the client device 104 and the server 110 if the security enforcer 214 obtains indication from the certificate verifier 212 of an invalid security certification. Additionally, in such example, the security enforcer enforces further security protocols (e.g., block future communications, determine Domain Generation Algorithm (DGA) behavior, self-signature detection, etc.).

The example communication bus 216 illustrated in FIG. 2 is a conductive hardware communication path. In some examples, the communication bus 216 represents wireless communication abilities in which the example support determiner 202, the example message copier 204, the example key generator 206, the example connection establisher 208, the example decrypter 210, the example certificate verifier 212, and/or the example security enforcer 214 may transmit and/or receive messages.

Figure 3:
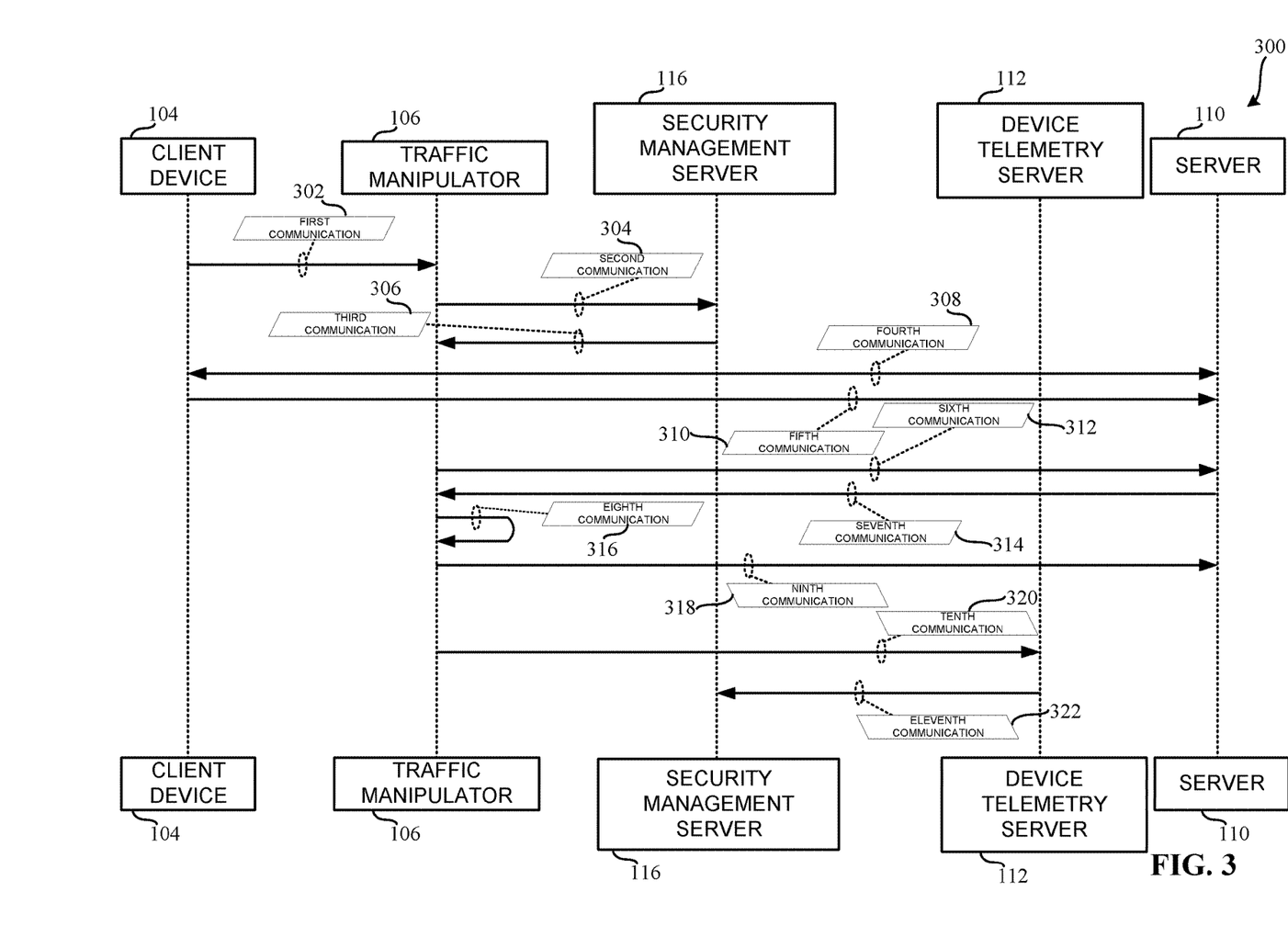
FIG. 3 is an example sequence diagram illustrating communication between the client device, the traffic manipulator, the security management server, the Device Telemetry Server, and the server of FIG. 1.

FIG. 3 is an example sequence diagram 300 illustrating communication among the client device 104, the traffic manipulator 106, the security management server 116, the Device Telemetry Server 112, and the server 110 of FIG. 1. As illustrated in FIG. 3, a first communication 302 from the client device 104 to the traffic manipulator 106 represents the observance of the initial client introductory message. A second communication 304 from the traffic manipulator 106 to the security management server 116 represents an initial request to determine if the requested domain in the client introductory message is known and trusted. In response a third communication 306 from security management server 116 to the traffic manipulator 106 represents an indication from the security management server 116 in response to the prior, second communication 304.

An example fourth communication 308 between the client device 104 and the server 110 represents the handshake between the client device 104 and the server 110 (e.g., the TLS handshake 118 of FIG. 1). Additionally, an example fifth communication 310 between the client device 104 and the server 110 represents the transmission of the client introductory message (e.g., the ClientHello message).

An example sixth communication 312 between the traffic manipulator 106 and the server 110 represents the transmission of the client introductory message (e.g., the ClientHello message). Additionally, an example seventh communication 314 between the traffic manipulator 106 and the server 110 represents the handshake between the traffic manipulator 106 and the server 110 (e.g., the Conditional TLS handshake 120 of FIG. 1). An example eighth communication 316 represents the traffic manipulator 106 decryption of the messages sent by the server 110.

An example ninth communication 318 between the traffic manipulator 106 and the server 110 represents the closure of the connection between the traffic manipulator 106 and the server 110. An example tenth communication 320 between the traffic manipulator 106 and the Device Telemetry Server 112 represents the transmission of the verification indication for further processing. In response, an example eleventh communication 322 represents the transmission and storage of the verification indication in the security management server 116.

While an example manner of implementing the validator 108 of FIG. 1 is illustrated in FIG. 2, one or more of the elements, processes and/or devices illustrated in FIG. 2 may be combined, divided, re-arranged, omitted, eliminated and/or implemented in any other way. Further, the example support determiner 202, the example message copier 204, the example key generator 206, the example connection establisher 208, the example decrypter 210, the example certificate verifier 212, the example security enforcer 214, and/or, more generally, the example validator 108 of FIGS. 1 and 2 may be implemented by hardware, software, firmware and/or any combination of hardware, software and/or firmware. Thus, for example, any of the example support determiner 202, the example message copier 204, the example key generator 206, the example connection establisher 208, the example decrypter 210, the example certificate verifier 212, the example security enforcer 214 and/or, more generally, the example validator 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example support determiner 202, the example message copier 204, the example key generator 206, the example connection establisher 208, the example decrypter 210, the example certificate verifier 212, the example security enforcer 214 and/or the example validator 108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example validator 108 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the validator 108 of FIG. 1 is shown in FIG. 2. The machine readable instructions may be one or more executable programs or portion(s) of an executable program for execution by a computer processor such as the processor 612 shown in the example processor platform 600 discussed below in connection with FIGS. 4-5. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 4-5, many other methods of implementing the example validator 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 4:
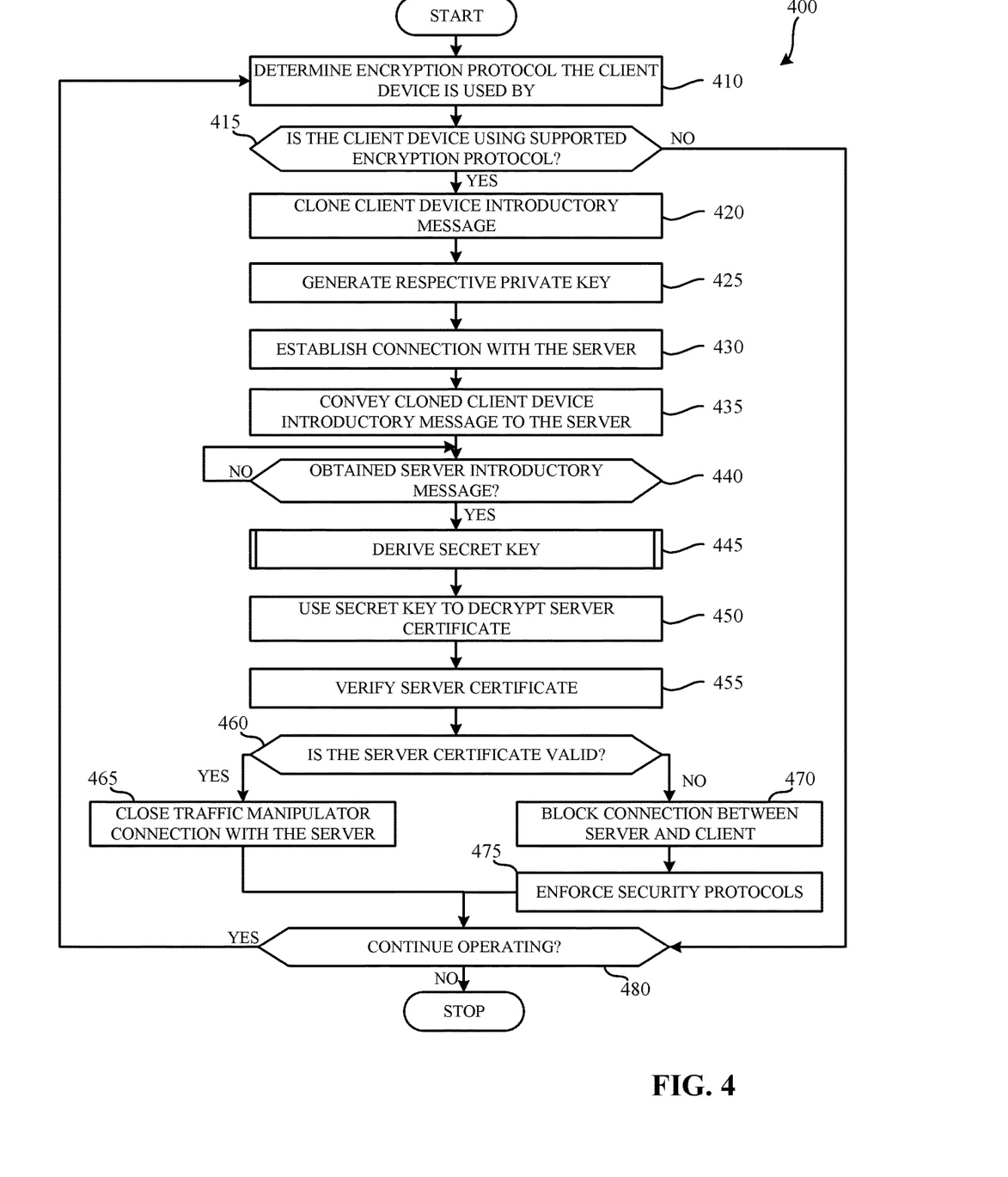
FIG. 4 is a flowchart representative of machine readable instructions which may be executed to implement the validator of FIG. 1 and/or FIG. 2 to verify a certificate.

FIG. 4 is a flowchart 400 representative of machine readable instructions which may be executed to implement the validator 108 of FIG. 1 and/or FIG. 2 to verify a certificate. The example support determiner 202 of FIG. 2 determines the type of mechanism for secure handshake that the client device 104 is using (block 410). Furthermore, the support determiner 202 determines if the mechanism for secure handshake being used by the client device 104 is supported or not (block 415). If the mechanism for secure handshake is supported (e.g., a mechanism for secure handshake that the validator 108 may interact with), then the message copier 204 clones the client introductory message (e.g., the ClientHello message) (block 420). If the mechanism for secure handshake is not supported (e.g., a mechanism for secure handshake that the validator 108 may not interact with), then the validator 108 determines whether to continue operating or not.

In response to communication from the message copier 204, the example key generator 206 generates a respective private key (block 425). The example connection establisher 208 initiates establishing a connection with the server 110 (block 430). The connection establisher 208 additionally conveys the cloned client introductory message to the server 110 (block 435). As such, the connection establisher 208 waits and/or determines if the server 110 responds with a server introductory message (block 440). If the connection establisher 208 obtains a server introductory message, the connection establisher 208 communicates such introductory message to the decrypter 210. In the connection establisher 208 does not obtain a server introductory message, control returns to a waiting state.

The example decrypter 210 derives a secret key in response to obtaining the server introductory message (block 445). Furthermore, the decrypter 210 uses the secret key to decrypt the server certificate being sent by the server 110 (block 450). The example certificate verifier 212 is in communication with the decrypter 210 to obtain the decrypted security certificate. As such, the certificate verifier 212 verifies the validity of the security certificate (block 455). Additionally, after verification of the security certificate, block 455, the certificate verifier 212 determines whether the security certificate is a valid certificate or an invalid certificate (block 460). In other examples disclosed herein, the security enforcer 214 may terminate the connection established with the server in block 430 and/or terminate connection between the client device 104 and the server 110.

If the security certificate is valid, the example security enforcer 214 closes the connection between the traffic manipulator 106 and the server 110 (block 465). Alternatively, if the security certificate is not valid, the security enforcer 214 blocks the connection between the client device 104 and the server 110 (block 470). In addition, the security enforcer 214 enforces security protocols to prevent future communication of an invalid security certificate (block 475). In other examples disclosed herein, the security enforcer 214 may perform the process illustrated in block 465 in response to determining the security certificate is invalid. Likewise, the process illustrated in block 475 may be performed in response to determining the security certificate is valid.

The example validator 108 determines whether to continue operating or not (block 480). If the validator 108 determines to continue operating, control returns to support determiner 202. Alternatively, if the validator 108 determines to cease operating, the process illustrated in FIG. 4 stops. Examples in which the process is to cease operating includes loss of power or damaged devices (e.g., a damaged client device 104, a damaged traffic manipulator 106, and/or a damaged server 110).

Figure 5:
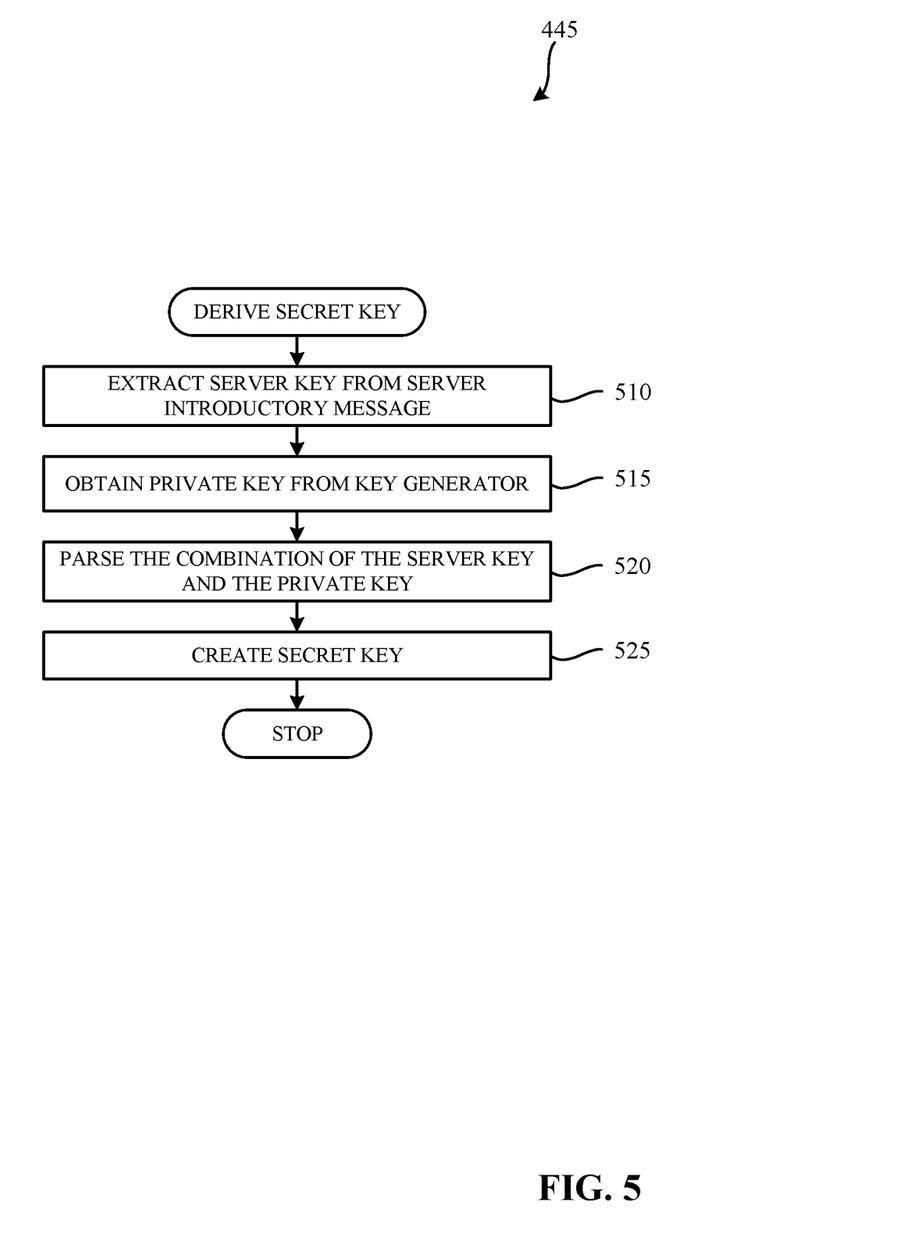
FIG. 5 is a flowchart representative of machine readable instructions which may be executed to implement the decrypter of FIG. 2 to derive a secret key.

FIG. 5 is a flowchart representative of machine readable instructions which may be executed to implement the decrypter 210 of FIG. 2 to derive a secret key. The decrypter 210 is in communication with the connection establisher 208. As such, the decrypter 210 parses the server introductory message to extract the server key (e.g., public key) (block 510). Additionally, the decrypter 210 is in communication with the key generator 206 to obtain the private key previously generated (block 515). In response, the decrypter 210 parses the combination of the server key and the private key (520). The decrypter 210 parses the combination of the private key and the server key is to create a respective secret key (block 525). After, control returns to block 450 of FIG. 4.

Figure 6:
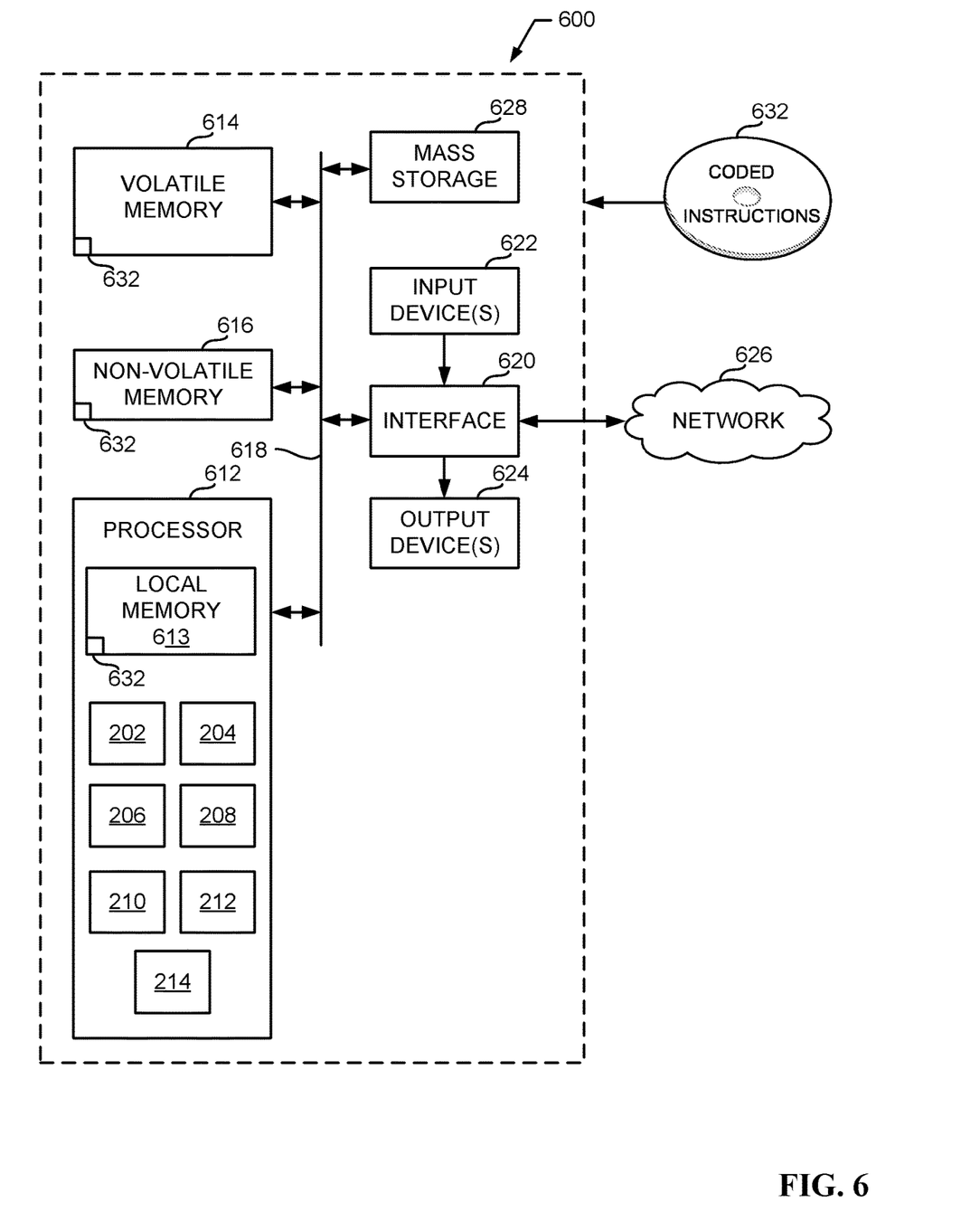
FIG. 6 is a block diagram of an example processing platform structured to execute the instructions of FIGS. 4-5 to implement the validator of FIGS. 1 and/or 2.

FIG. 6 is a block diagram of an example processor platform 600 structured to execute the instructions of FIGS. 4-5 to implement the validator 108 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example support determiner 202, the example message copier 204, the example key generator 206, the example connection establisher 208, the example decrypter 210, the example certificate verifier 212, the example security enforcer 214, and the example validator 108.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4-5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that verify encrypted handshakes. The disclosed methods, apparatus and articles of manufacture improve the efficiency of using a computing device by verifying encrypted handshakes between a client device and a server without acting as a full proxy. The disclosed methods, apparatus and articles of manufacture include a traffic manipulator acting as a partial proxy, therefore allowing for the verification of encrypted handshake messages without having to install root certificates on client devices or edge nodes and reducing processing power required compared with acting as a full proxy. In such disclosed methods, apparatus and articles of manufacture, the partial proxy utilizes less computing power and computing resources and does not require the installation of certificates on client devices in a home network. The disclosed methods, apparatus and articles of manufacture solve the computing issue previously requiring extensive processing resources to verify client to server handshakes by operating in parallel to initiate a conditional handshake. The disclosed methods, apparatus and articles of manufacture are accordingly directed to one or more improvement(s) in the functioning of a computer.

It is noted that this patent claims the benefit of and priority from Indian Provisional Patent Application Serial Number 201941002776, which was filed on Jan. 23, 2019, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
at least one memory;
instructions; and
at least one processor to execute the instructions to:
clone a client introductory message without cloning Diffie-Hellman parameters of the client introductory message, the client introductory message included in a first handshake for network communication between a client and a server;
initiate a second handshake between the apparatus and the server based on the cloned client introductory message;
generate a key for the second handshake, the key generated based on a Diffie-Hellman group selected by the client; and
in response to the second handshake, decrypt a certificate sent by the server.

2. The apparatus of claim 1, wherein the processor is to execute the instructions to terminate the second handshake in response to decrypting the certificate.

3. The apparatus of claim 2, wherein the processor is to execute the instructions to terminate the first handshake in response to an indication that the certificate is invalid.

4. The apparatus of claim 1, wherein the processor is to execute the instructions to, in response to observing the first handshake between the client and the server, determine if the first handshake includes a mechanism for secure handshake supported by the apparatus.

5. The apparatus of claim 4, wherein the mechanism for secure handshake supported by the apparatus is transport layer security (TLS) version 1.3.

6. The apparatus of claim 1, wherein the processor is to execute the instructions to initiate the second handshake in parallel with the first handshake.

7. The apparatus of claim 1, wherein the processor is to execute the instructions to communicate with a second server to convey an indication representing at least one of a valid certificate or an invalid certificate.

8. A method to verify encrypted handshakes, the method comprising:
cloning a client introductory message without cloning Diffie-Hellman parameters of the client introductory message, the client introductory message included in a first handshake for network communication between a client and a server;
initiating a second handshake between a traffic manipulator and the server based on the cloned client introductory message;
generating a key for the second handshake, the key generating based on a Diffie-Hellman group selected by the client; and
in response to the second handshake, decrypting a certificate sent by the server.

9. The method of claim 8, further including terminating the second handshake in response to the certificate being decrypted.

10. The method of claim 9, wherein the first handshake is terminated in response to an indication that the certificate is invalid.

11. The method of claim 8, further including, in response to observing the first handshake between the client and the server, determining if the first handshake includes a mechanism for secure handshake supported by the traffic manipulator.

12. The method of claim 11, wherein the mechanism for secure handshake supported by the traffic manipulator is transport layer security (TLS) version 1.3.

13. The method of claim 8, wherein the second handshake is initiated in parallel with the first handshake.

14. A non-transitory computer readable medium comprising computer readable instructions which, when executed, cause at least one processor to at least:
clone a client introductory message without cloning Diffie-Hellman parameters of the client introductory message, the client introductory message included in a first handshake for network communication between a client and a server;
initiate a second handshake between a traffic manipulator and the server based on the cloned client introductory message;
generate a key for the second handshake, the key generated based on a Diffie-Hellman group selected by the client; and
in response to the second handshake, decrypt a certificate sent by the server.

15. The computer readable medium of claim 14, further including the at least one processor to terminate the second handshake in response to the certificate being decrypted.

16. The computer readable medium of claim 14, further including the at least one processor to, in response to observing the first handshake between the client and the server, determine if the first handshake includes a mechanism for secure handshake supported by the traffic manipulator.

17. The computer readable medium of claim 14, further including the at least one processor to initiate the second handshake in parallel with the first handshake.

* * * * *